United States Patent [19]

Puchalski, Jr. et al.

[11] 4,215,969

[45] Aug. 5, 1980

[54] LOAD HANDLING APPARATUS

[75] Inventors: Theodore J. Puchalski, Jr., Mechanicsville, Va.; Robert J. Albrecht, River Edge, N.J.; Albert A. Pinto, White Plains, N.Y.

[73] Assignee: Nabisco, Inc., East Hanover, N.J.

[21] Appl. No.: 923,651

[22] Filed: Jul. 7, 1978

[51] Int. Cl.³ .............................................. B65G 65/04
[52] U.S. Cl. .................................................... 414/571
[58] Field of Search ............... 414/349, 500, 538, 559, 414/20, 475, 571, 110; 254/88, 174

[56] References Cited

U.S. PATENT DOCUMENTS

| 2,557,580 | 6/1951 | Summers | 414/538 |
| 3,088,709 | 5/1963 | Hunt | 254/166 |
| 3,495,730 | 2/1970 | Rigsby | 414/785 |

Primary Examiner—Lawrence J. Oresky
Attorney, Agent, or Firm—Gerald Durstewitz; Paul E. O'Donnell

[57] ABSTRACT

A load handling device for drawing a load up an inclined plane onto a pallet. The device comprises a winch arrangement mounted on a wheeled cart. The cart is provided with a pallet engaging member to be positioned against the side of the pallet which is opposite to the inclined plane.

10 Claims, 10 Drawing Figures

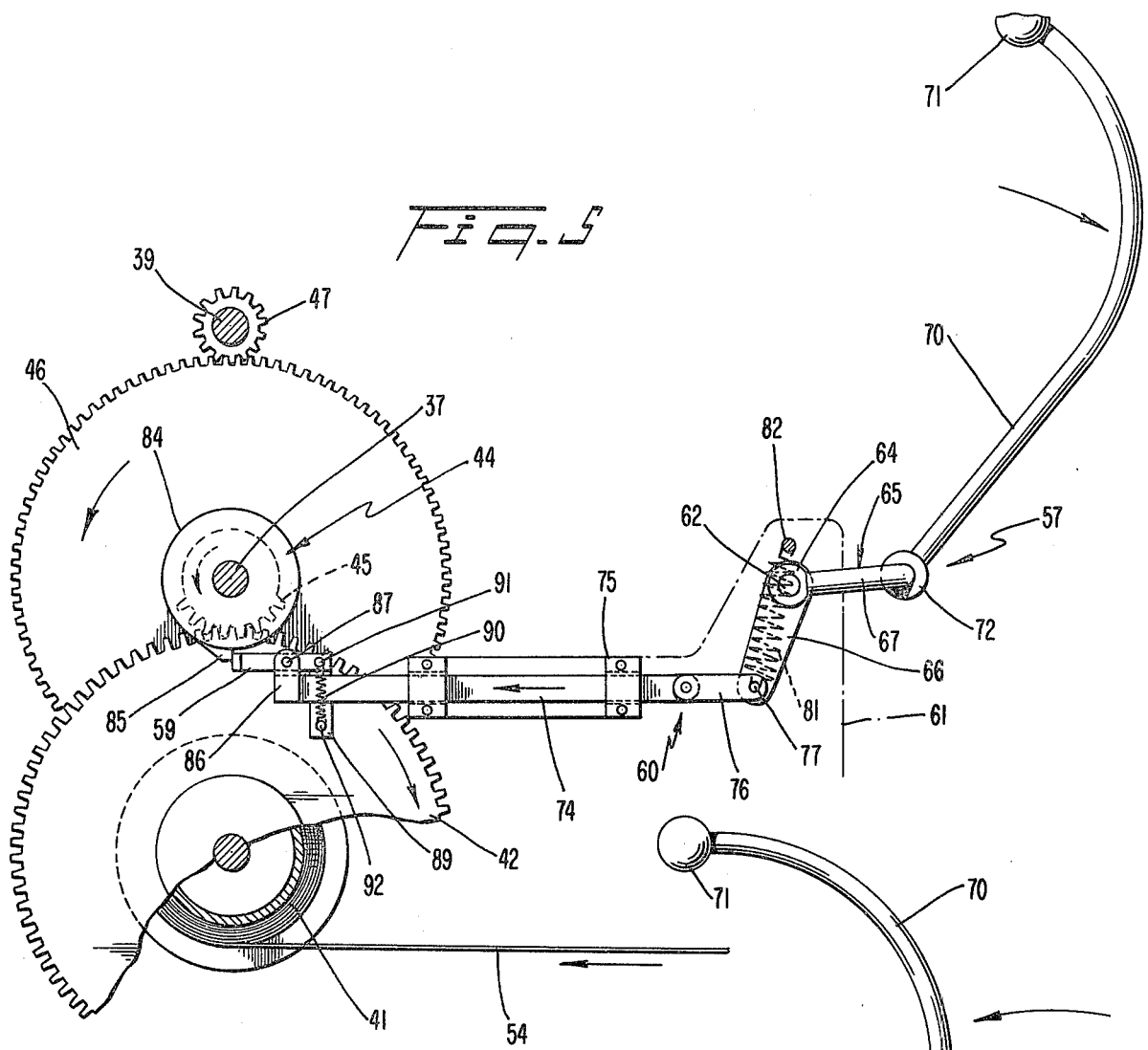
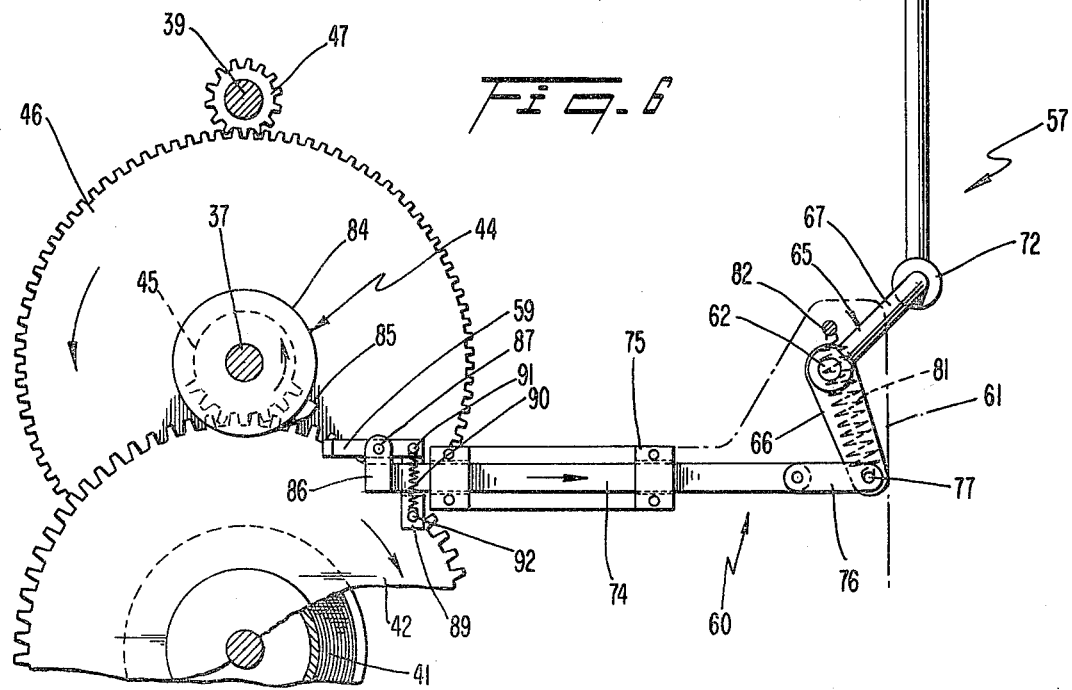

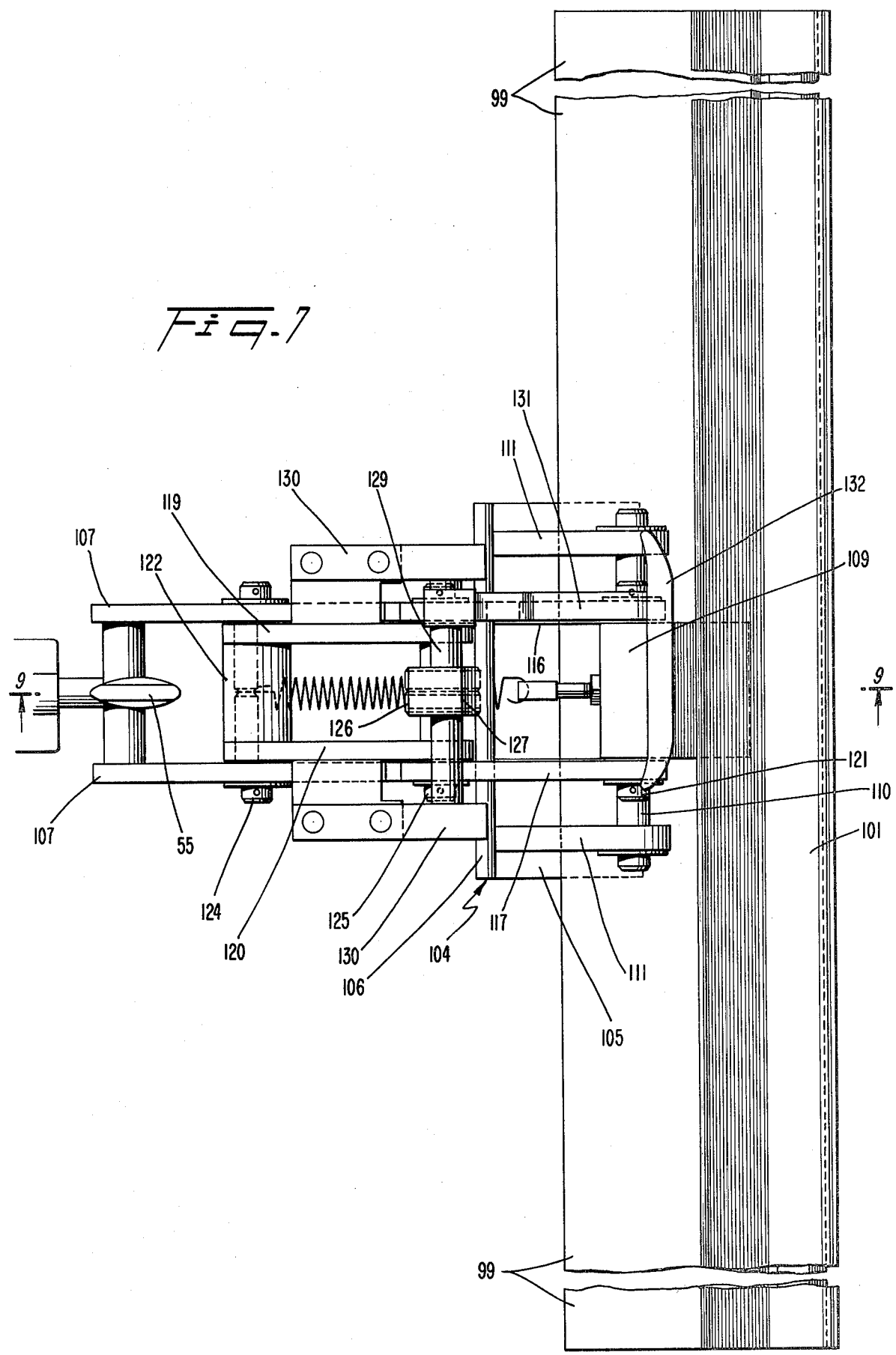

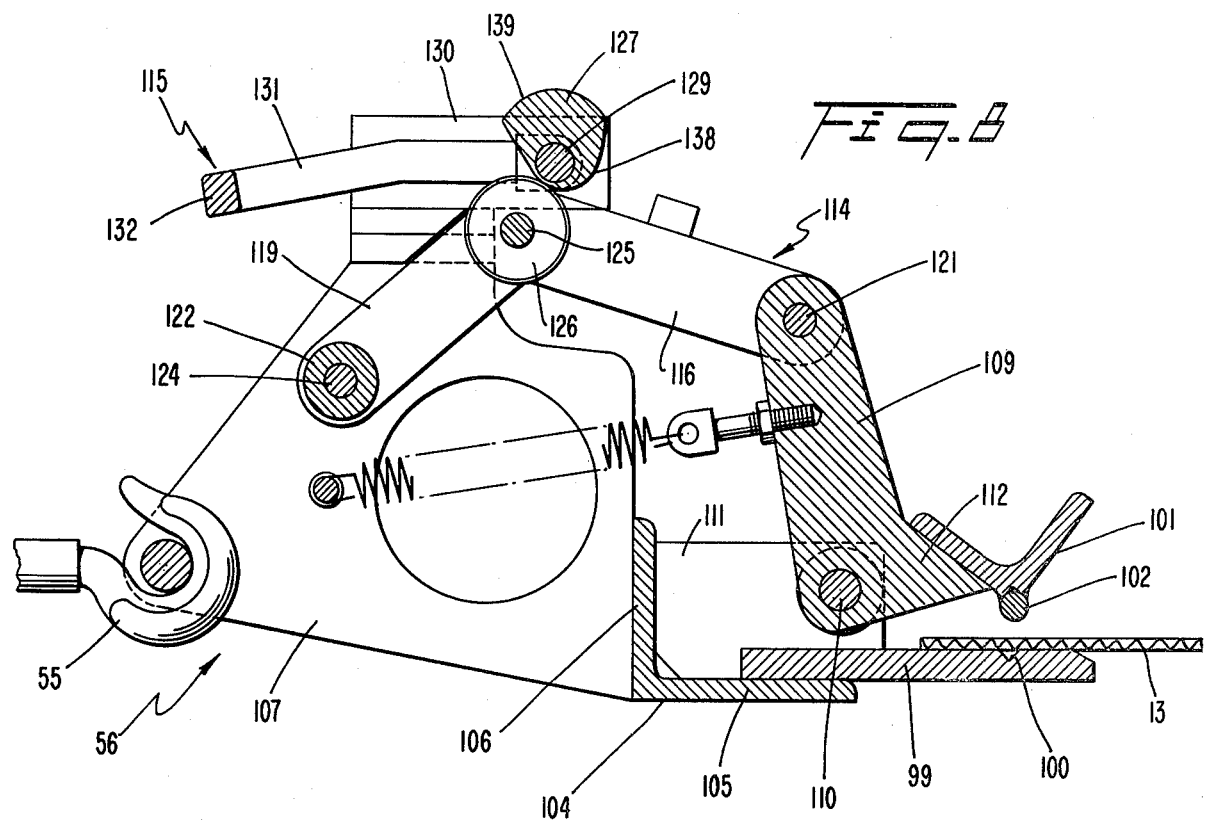
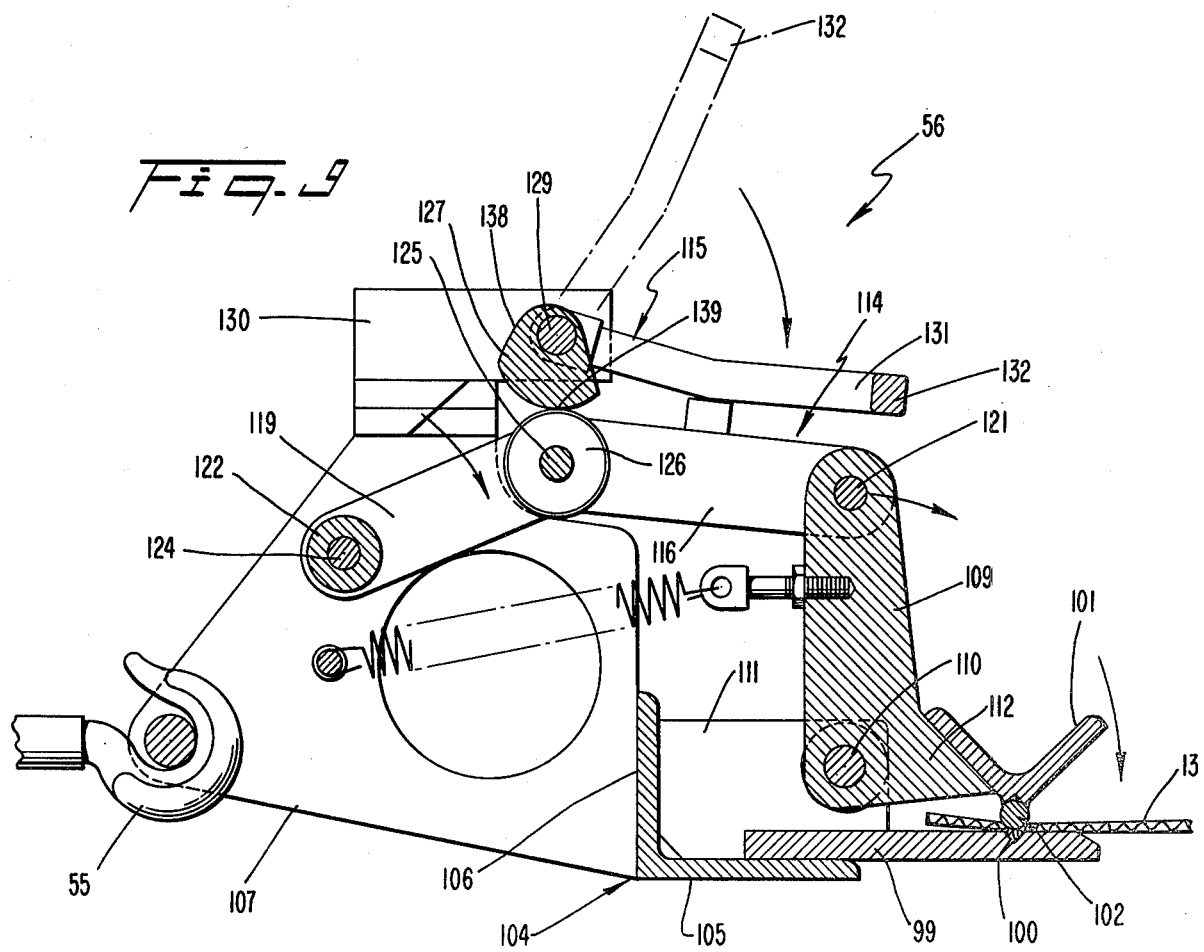

LOAD HANDLING APPARATUS

BACKGROUND OF THE INVENTION

The present invention relates to load handling apparatus and more particularly to apparatus for transferring a load to a pallet.

A method commonly used in the transportation of materials is to load boxes or bags of the materials onto pallets and to move the pallet and its load as a unit. Normally, the load is secured to the pallet by straps, a sleeve of shrink plastic or by other means. The pallets are formed so that they may be handled by a fork lift truck. The unitized pallet loads are transported by railroad and/or truck transportation systems to warehouses and from there to the ultimate destination. The utilized loads are then broken up and the load materials are separated from the pallets. The ultimate destination locations must then store the pallets and ship them back to the load-pallet unitizing location. In many industries, the cost of storage and shipment of the pallets and, in addition, the cost of lost and broken pallets, represents a sizable cost factor. For this reason, cardboard sheets, called slip sheets, have been considered as a substitute for the wooden or plastic pallets. One of the problems attendant with the use of slip sheets is that a unitized slip sheeted load cannot be handled by the conventional fork lift truck in use in most receiving installations. Although special fork lift trucks have been devised for such operations, they are very large and expensive and cannot be used at smaller installations because of size and economic limitations.

SUMMARY OF THE INVENTION

It is an object of the present invention to provide improved load handling apparatus for moving a slip sheeted load onto a pallet.

The object of the present invention is accomplished by providing in combination a base adapted to be maneuvered over a floor surface, a pallet engaging member on the base to be positioned against the side of a pallet, a ramp or inclined plane being positioned on the other side of the pallet, and winch means mounted to said base including a cable for extending across the pallet and the inclined plane, the cable being provided with a clamp for gripping the slip sheet of a slip sheeted load positioned at the foot of the inclined plane.

BRIEF DESCRIPTION OF THE DRAWING

A preferred embodiment of the invention has been chosen for purposes of illustration and description, and is shown in the accompanying drawings, forming a part of the specification, wherein:

FIGS. 5 and 6 are partial side elevations illustrating the operation of the shut-off mechanism of the apparatus;

FIG. 7 is a plan view of the clamp portion of the apparatus for gripping the load bearing skip sheet;

FIG. 8 is a sectional side elevation of the clamp of FIG. 7 shown in its open condition;

FIG. 9 is a sectional side elevation taken along line 9—9 on FIG. 7 showing the clamp in its closed position.

DESCRIPTION OF THE PREFERRED EMBODIMENT

Figure 1:
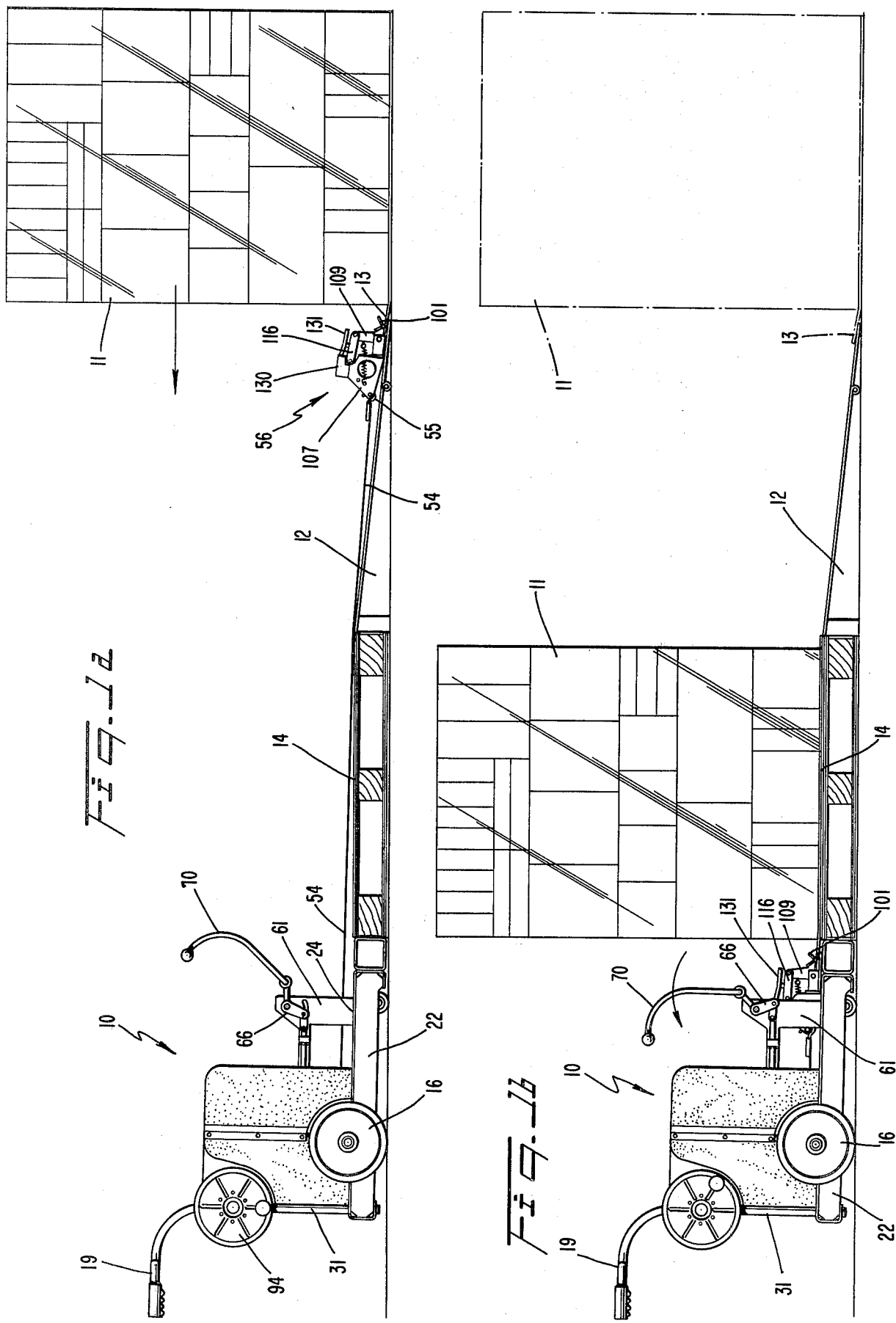
FIG. 1a is a side elevational view of apparatus according to the present invention shown at the beginning of a load positioning operation.
FIG. 1b is a view similar to FIG. 1a showing the apparatus at the end of the load positioning operation.

Referring to the drawings in detail, there is shown a unit 10 according to the present invention for drawing a load 11, positioned on a cardboard slip sheet 13, up a ramp unit 12 onto a pallet 14.

The unit 10 comprises a base 15, a pair of rear wheels 16 and a front castered wheel 17 mounted to the base, maneuvering handles 19, a horizontally extending pallet engaging member 20, and an electric winch arrangement 21.

The base 15 is formed of side plates 22, a top plate 24, a front plate, and a rear plate 26. The plates 22, 24, 25 and 26 are welded together to form a rectangular box shaped structure which is the base 15. The pallet engaging member 20 is welded to the front plate 25. The rear wheels 16 are journalled in bearings 29 which are mounted to the top surface of the plate 24 and the castered wheel 17 is mounted to the bottom surface of the plate 24.

The handles 19 are the ends of a "C" shaped horizontally oriental tubular bar 30. The bar 30 is attached to the upper ends of two curved tubular bars 31 which extend vertically from the rear of the base 15 and then curve rearwardly through a 90 degree arc to engage the handle bar 30.

The winch arrangement includes a pair of spaced structural channel members 32 which extend vertically from the base 15 and a horizontal channel member 34 extending between the upper ends of the members 32. Tubular structural members 35 extend horizontally from the upper rear side of each of the members 32 to the vertical bars 31.

Three horizontal shafts 36, 37 and 39 are mounted to the front faces of the vertical channel members, one above another, by means of pairs of bearings 40. A reel 41 is mounted on the lower shaft 36 between the members 32 and is rotationally locked to the shaft.

Figure 4:
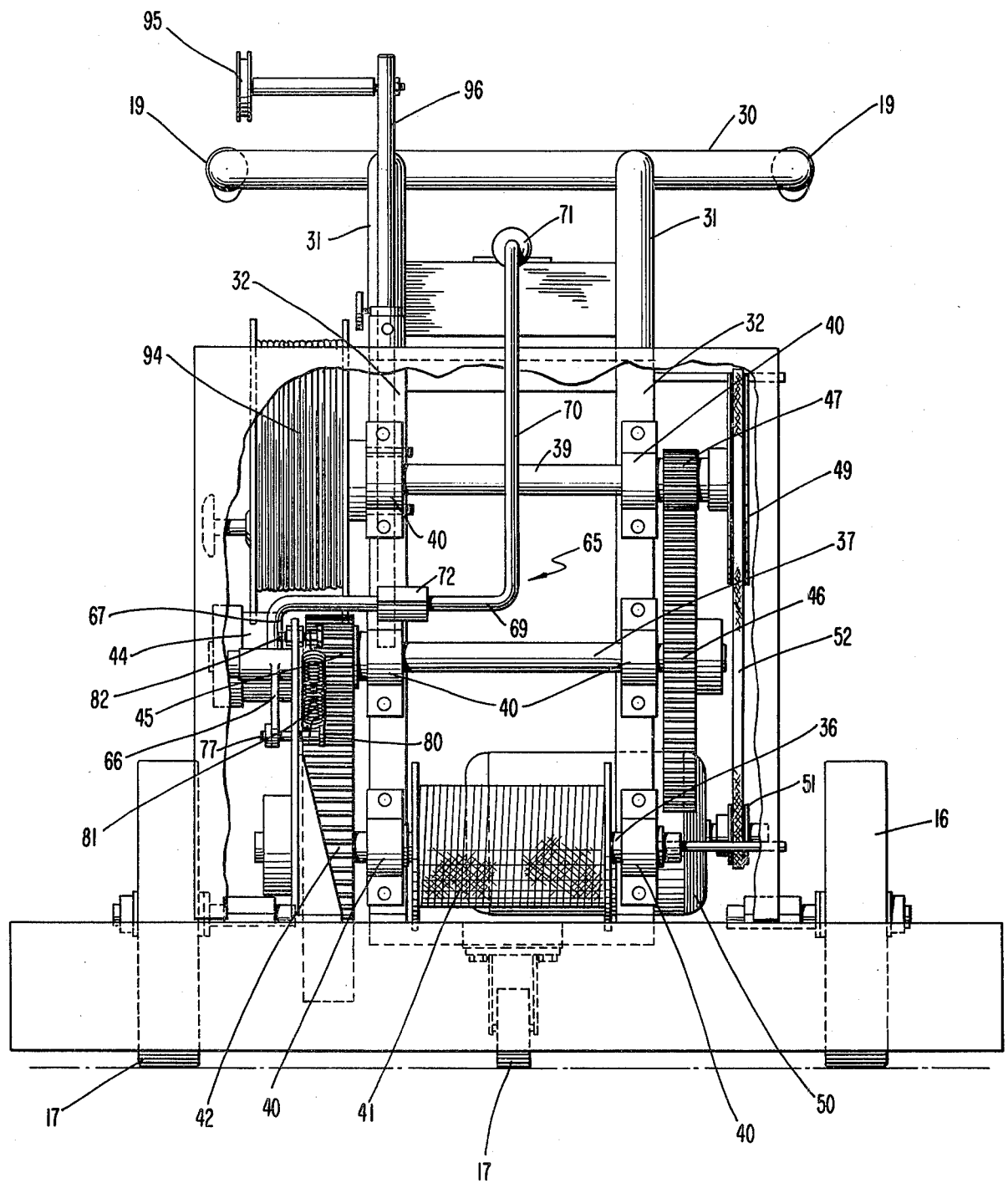
FIG. 4 is a front elevational view of the apparatus.

As seen in FIG. 4, a large gear 42 is mounted on the left end of the shaft 36. The middle shaft 37 has a clutch 44 and gear 45 mounted on its left end, and a large gear 46 mounted on its right end. The gear 45 meshes with the gear 42 below and is controlled by the clutch 44. The clutch has two operational positions: one in which the gear 45 is locked to the shaft 37; the other in which the gear 45 is free to turn relative to the shaft 37. A small gear 47, meshed with the gear 46 below, and a pulley 49 are mounted on the right end of the upper shaft 39. The shaft 39 is driven by an electric motor 50 mounted on the plate 24 of the base 15. The output shaft of the motr carries a small pulley 51 and a drive belt 52 connects the pulley 51 with the pulley 49.

The motor 50 drives the shaft 39 and the gear 47 drives the shaft 37 through the gear 46. When the gear 56 is locked to the shaft 37 by the clutch 44, it drives the gear 42 to rotate the reel 41.

The reel 41 has a length of flat cable 54 made of woven nylon or the like, wound thereon. The end of the cable 54 is provided with a hook 55 which engages a slip sheet clamping apparatus 56. When the clutch 44 is disengaged so that the gear 45 turns independently of the shaft 37, the drum 41 will rotate freely allowing the cable 54 to be extended to a load as shown in FIG. 1a. When the clutch is engaged, the electric motor drives the shaft 36 to rotate the drum 41 and rewind the cable drawing the load up the ramp 12 and onto the pallet 14.

The clutch 44 is controlled by lever 57 which extends and retracts a clutch operating finger 59 through a linkage 60.

The lever 57 is pivoted on a vertical frame member 61 mounted near the front end of the base 15. A pin member 62 extends horizontally from the frame member 61 near its upper end. The lever 57 is formed with a tubular formation 64 which pivots on the pin 62. A long lever arm 65 having multiple bends and a short lever arm 66 extend from the formation 64. The lever arm 65 has a short leg 67 extending from the formation 64 upwardly toward the front of the unit 10, a longer horizontal leg 69 extending from the leg 67 to the centerline of the unit, and a curved leg 70 extending upwardly from the end of the leg 69. A ball 71 is mounted on the upper end of the leg 70. The horizontal leg 69 is made in two parts connected by a coupling 72 to allow the angular orientation to be adjusted.

Figure 2:
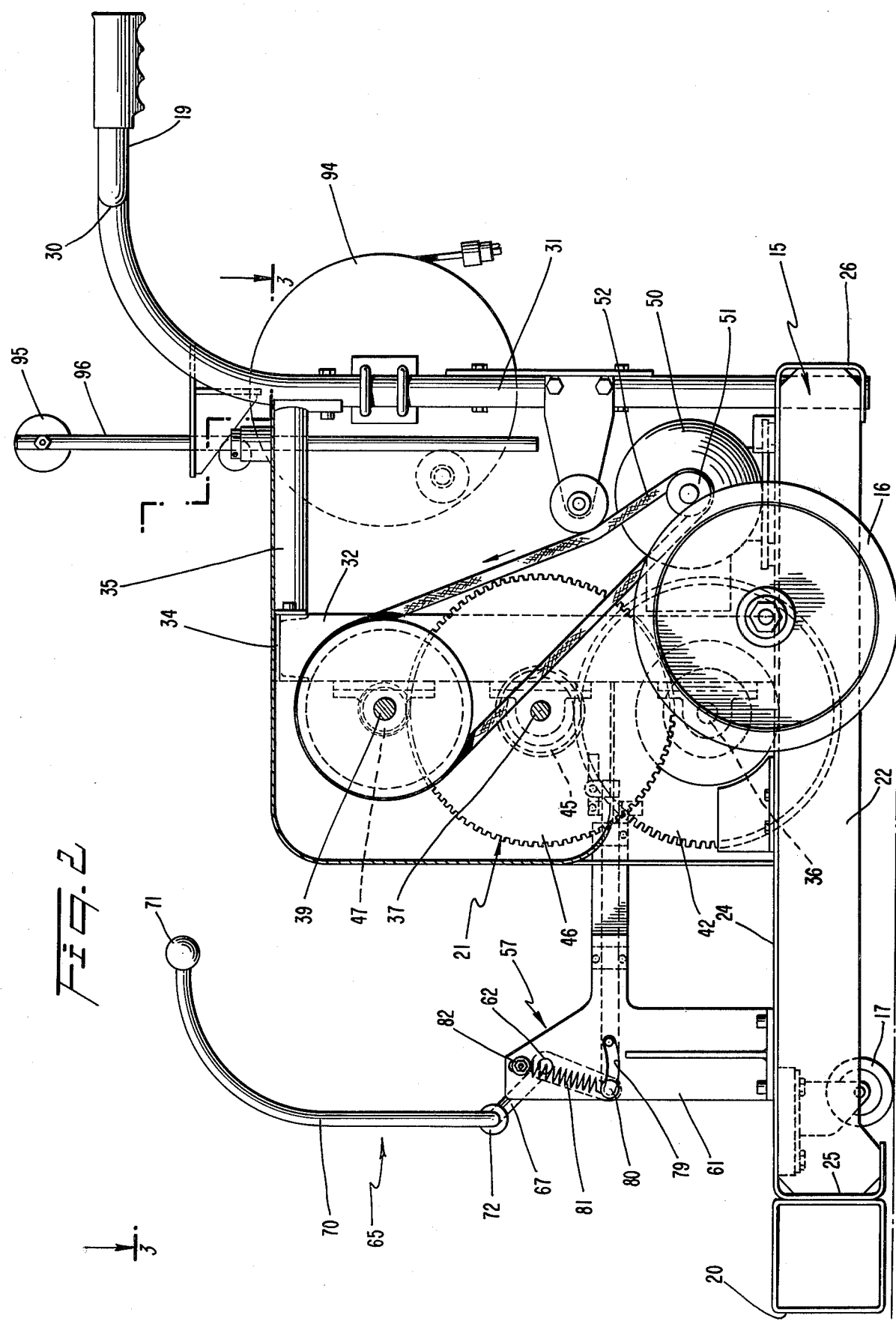
FIG. 2 is a sectional side elevational view of the load handling apparatus shown in FIGS. 1a and 1b.
Figure 3:
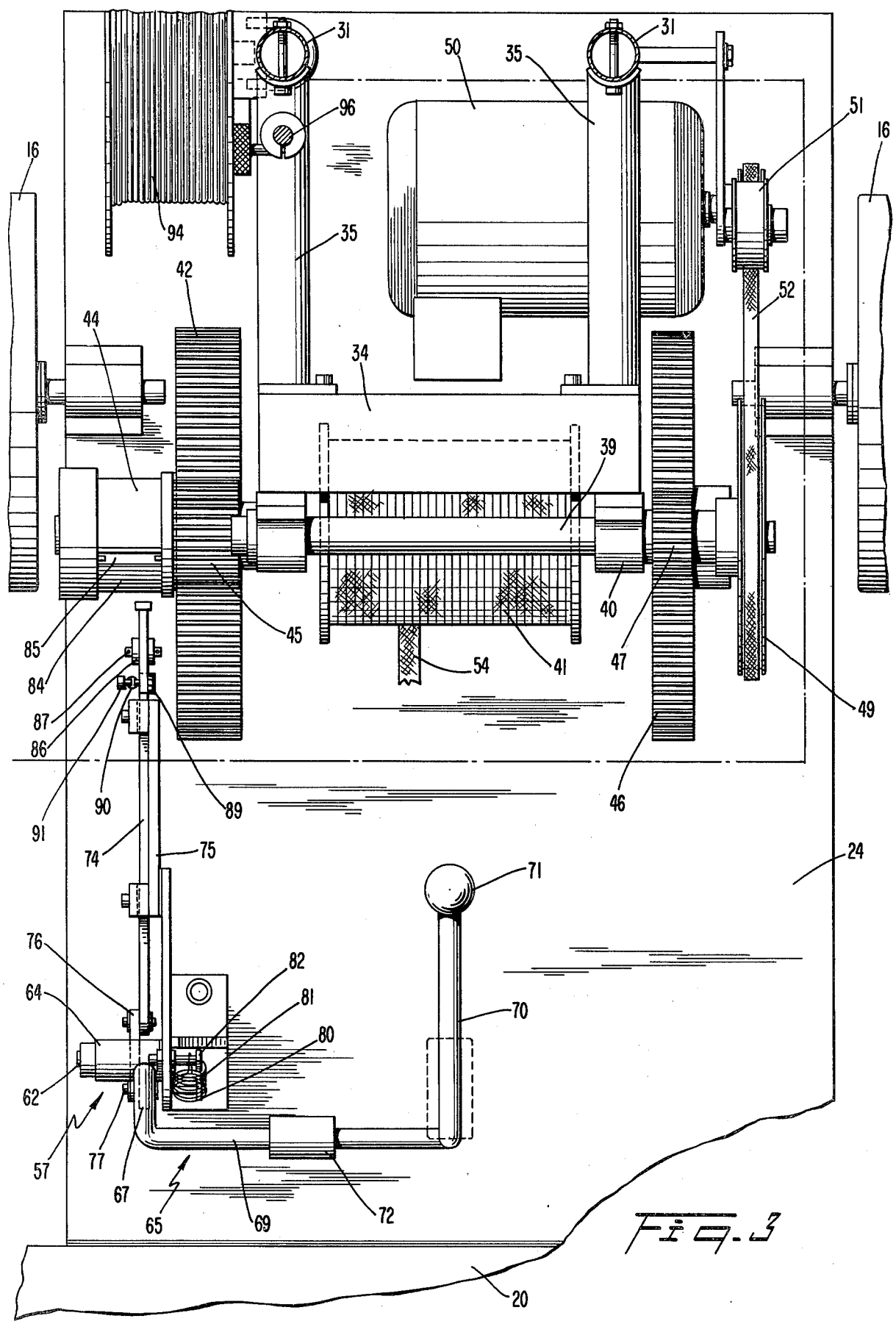
FIG. 3 is a sectional plan view taken along line 3—3 on FIG. 2.

The linkage 60 includes a bar 74 slideably positioned in a guide member 75, and a link 76. The pin 77 extends through an accurate slot 79 in the frame member 61 and has a head 80 as is shown in FIG. 2. The head 80 is spaced from the member 61 (see FIG. 3) to permit one end of a coil spring 81 to be connected to the pin. The other end of the spring is connected to a bolt 82 positioned vertically above the pivot pin 62.

Referring to FIGS. 1a, 1b, 5 and 6, the lever 57 is moveable between two positions. In FIGS. 1a and 5, the lever is positioned so that the leg 70 of the lever arm 65 is extended to be contacted by the load 11 as it is drawn into position on the pallet. The lever 57 is held in this position by the spring 81, which exerts a force on the pin 77 along a line passing to one side of the center line of the pivot pin 62. The spring therefore imposes a clockwise (as seen in FIG. 5) turning moment on the lever arm 66. In this position, the finger 59 is extended to engage the clutch 44. The clutch 44 is a conventional commercial clutch of the spring type and has an outer housing 84 provided with an operating tooth 85. The finger 59 engages the tooth 85 and prevents further rotation of the housing 84 when the outer housing 84 is held against rotation with the shaft 37, the clutch engages to transmit power to the gear 45 and drive the drum 41 through the gear 42.

As the load 11 is positioned on the pallet 14, the side of the load is pressed against the curved leg 70 of the lever 57 and rotates the lever counter clockwise as viewed in the drawings. When the line of force of the spring 31 (the line between the pin 77 and the bolt 82) moves to right of the center of the pivot 62, the spring imposes a counter clockwise turning moment on the lever 57 which snaps it into the position shown in FIGS. 1b and 6.

The finger 59 (although it moves to the right) maintains contact with the tooth 85 until the "snap over" point is reached. The motion of the finger 59 before reaching the "snap over" position allows about 30 degrees of rotation of the clutch housing 84 which is insufficient to cause the clutch to disengage.

The finger 59 is mounted to the bar 74 by means of a short vertical plate 86 mounted on each side of the end of the bar. The finger is pivoted on a pin 87 extending through the plates 86. Another plate 89 is secured to the bar 74 and extends downwardly beneath the inboard end of the finger 59. A spring 90 extends from a pin 91 on the inboard end of the finger to a pin 92 on the lower end of the plate 89. This arrangement is provided to prevent damage should the tooth 85 be positioned so that the leading edge of the finger 59 strikes the tapered face of the tooth. In such an instance, the finger pivots downwardly (counter clockwise) and continues its horizontal motion, the spring 90 resetting the finger to engage the tooth on its next revolution.

A reel 94 is provided on the unit 10 to store the electrical cable for powering the electric motor 50. A pulley 95 mounted on a vertical bar 96 may be provided to elevate the cable running to the electrical outlet to keep it from under the wheels of the unit.

The clamping apparatus 56, as shown in FIGS. 7—9, is provided with two clamping members for gripping the slip sheet 13: a long flat plate 99 having a longitudinal groove 100 in its upper surface; and an angle iron 101 having a round bar 102 welded to the corner thereof. An angle section 104 is secured to the center of the plate 99. The section 104 has a horizontal leg 105 welded to the plate 99 and a vertical leg 106 welded to the ends of two spaced irregularly shaped plate members 107. The angle iron 101 is welded to a body 109 which is pivoted on a shaft 110 extending between a pair of vertical wall members 111. The body 109 is generally rectangular and vertically oriented with a triangular formation 112 extending forward from its lower end. The angle iron 101 is welded to the formation 112 and the shaft 110 passes through the bottom end of the body 109.

As shown in FIG. 9, the body 109 is pivoted about the shaft 110, by means of a linkage assembly 114 and a cam lever 115 arrangement, to move the angle iron 101 toward the groove 100 to grip the slipsheet. The linkage assembly includes a first pair of parallel link members 116, 117 and a second pair of parallel link members 119, 120. The link members 116, 117 are positioned on opposite sides of the body 109 and are pivotally connected thereto by a pin 121 extending through the body. The link members 119, 120 are positioned between the plates 107 and on opposite ends of a tubular body 122. The link members 119 and 120 are pivotally secured to the plates 107 by a pin 124. The ends of the link members 119 and 120 extend between the ends of the link members 116 and 117. A pin 125 extends through the overlapping ends of the link members 116, 117, 119 and 120. A steel roller 126 is mounted on the pin 125 half way between the members 119, 120.

The cam lever arrangement 115 includes a cam 127 mounted on a shaft 129 that is journalled in two blocks 130 mounted on the plates 107. A lever arm 131 is mounted on the shaft 129 and is provided with a handle 132. A small formation 134 is provided on the top of the link member 116 to limit the motion of the lever 131.

The block 109 is biased in the counter clockwise direction by a coil spring 135. The spring extends between an eye bolt 136 treaded into the block 109 and a pin 137 extending between the plates 107.

The outer surface of the cam 127 includes a camming portion 138 along which the distance from the surface to the axis of the shaft 129 increases gradually, and a locking portion 139 along which the distance from the surface to the axis of the shaft 129 is constant.

Motion of the handle 132 from the position shown in FIG. 8 to that shown in FIG. 9 rotates the cam 127. The camming surface forces the wheel 126 downwardly.

The block 109 is thereby rotated in the clockwise direction to clamp the slipsheet between the angle iron 101 and the plate 99. Rotation of the cam 127 to bring the surface portion 139 into contact with the wheel locks the clamping apparatus in the clamping position.

In operation, to transfer a slipsheeted load 11 onto a pallet 14, a ramp 12 is positioned next to the load and the pallet is abutted to the high side of the ramp. The unit 10 is rolled into place with its panel engaging member 20 abutting the opposite side of the pallet. The electrical cord on the reel 94 is plugged into a wall socket, and with the lever arm in the position shown in FIG. 6, the cable 54 is drawn from the reel 41. At this point, the reel 41 is isolated from the motor drive train by the clutch 44 and therefore is free to turn independently. The plate 99 of the clamp 56 is slid under the edge of the slip sheet as shown in FIG. 8 and the cam lever 115 is rotated toward the load, as shown in FIG. 9, to lock the clamp.

The drive train is then connected to the reel 41 by moving the lever 47 into the position shown in FIGS 1a and 5. The reel 41 then reels in the cable, drawing the load up the ramp and onto the pallet. The leading edge of the load 11 engages the curved leg of the lever 47 and rotates it toward the clutch disengaging position. When the pin 77 (FIGS. 5 and 6) passes beneath the pivot pin 62, the spring 66 snaps the lever into the position shown in FIGS. 1b and 6 to disengage the clutch 44.

It will be seen from the foregoing that the present invention provides novel and improved load handling apparatus for moving a slip sheeted load onto a pallet.

We claim:

1. Apparatus for readying a slip-sheeted load resting on a floor surface for transport by fork lift equipment comprising in combination an inclined plane unit to be placed on said surface adjacent the load to provide for said load an inclined plane extending upwardly from said surface, a pallet unit to be place on said surface abutting said inclined plane unit in alignment with said inclined plane and the load, and a load handling unit including a base, an elongated horizontal member mounted on said base for engaging said pallet, means for maneuvering said load handling unit upon said surface to position said horizontal member against the side of the pallet unit opposite to the inclined plane, a clamp for engaging the slip sheet of the slip-sheeted load, and winch means mounted to said base including a cable element attached to said clamp to be extended from said load handling unit across the pallet unit and down the inclined plane to the load.

2. Apparatus according to claim 1 wherein said winch means includes an electric motor, a reel for said cable element, and a drive train operatively connecting said electric motor and said reel to wind up said cable, including clutch means for interrupting the driving connection between the motor and the reel.

3. Apparatus according to claim 2 including a plurality of wheels supporting said base, and handle means, at least one of said wheels being castered so that said apparatus can be maneuvered by pressure exerted upon said handle means.

4. Apparatus according to claim 3 including clutch operating means comprising a lever and a linkage connecting said clutch and said lever, said lever having a first position in which said reel is driven and a second position in which said reel is free-wheeling, said lever being positioned to be engaged by the load and moved from said first position to said second position as the load is positioned on said pallet.

5. Apparatus according to claim 4 including a frame member mounted on said base, said lever being journalled to said frame member to rotate about a pivot axis, said lever having a short arm which is connected to said linkage, a first pin on the end of said short lever arm, a second pin on the other side of said pivot axis from said first pin, and a tension spring stretched between said first and second pins, said first pin being positioned so that the spring force tends to rotate the lever in one direction when the lever is in its first position and in the opposite direction when the lever is in its second position.

6. Apparatus according to claim 1 wherein said clamp includes first and second elongated clamping members, said first clamping member comprising an elongated flat bar having a longitudinal groove on its upper surface, said second clamping member having an edge for cooperating with said groove to clamp a slip sheet therebetween, a frame structure rigidly connected to said first clamping member, a lever member carrying said second clamping member and pivoted on said frame structure to move said second clamping member into a clamping position, a cam engaging member pivoted to said frame structure by first link means and pivoted to said lever member by second link means, a cam mounted on said frame structure for engaging said cam engaging member, and handle means for rotating said cam to displace said cam engaging means and pivot said lever member.

7. Apparatus according to claim 6 wherein said frame structure includes a pair of spaced vertical plates, said first and second link means being mounted between said plates, said first link means being pivotally mounted on a pin extending between said plates.

8. Apparatus according to claim 7 wherein said first link means and said second link means are pivotally joined by a second pin, said first and second link means each comprising a pair of spaced parallel links, said cam engaging member being mounted on said second pin between said spaced links of said first and second link means each comprising a pair of spaced parallel links, said cam engaging member being mounted on said second pin between said spaced links of said first and second link means, said cam being mounted on a shaft parallel to said pins.

9. Apparatus according to claim 3 including a pair of vertical frame members mounted on said base, said reel being rotatably mounted to said frame members by means of a first shaft, a second shaft being mounted on said frame members above said reel, a third shaft being mounted on said frame members above said second shaft, belt means providing a driving coupling between said motor and said third shaft, intermeshing gears mounted on said third and second shafts for driving said second shaft, and intermeshing gears mounted on said second and first shafts for driving said reel.

10. Apparatus according to claim 9 wherein one of said intermeshing gears mounted on said second shaft contains said clutch means.

* * * * *